(12) United States Patent
Chung

(10) Patent No.: US 8,310,632 B2
(45) Date of Patent: Nov. 13, 2012

(54) LAMINATED STRUCTURES USING UV-CURABLE ADHESION PROMOTERS

(75) Inventor: Young J. Chung, Calabasas, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 0 days.

(21) Appl. No.: 12/799,972

(22) Filed: May 4, 2010

(65) Prior Publication Data

US 2010/0221459 A1     Sep. 2, 2010

Related U.S. Application Data

(60) Division of application No. 11/478,957, filed on Jun. 29, 2006, now abandoned, which is a continuation-in-part of application No. 11/434,641, filed on May 15, 2006, now Pat. No. 7,671,945, which is a continuation-in-part of application No. 11/241,070, filed on Sep. 30, 2005, now Pat. No. 7,515,231.

(51) Int. Cl.
*G02F 1/1335* (2006.01)

(52) U.S. Cl. ........ 349/117; 349/118; 349/119; 349/122; 349/123; 349/127; 428/412; 528/310; 528/393

(58) Field of Classification Search .......... 349/122, 349/95, 112, 117, 118, 119, 123, 127; 428/412; 528/310, 393
See application file for complete search history.

(56) References Cited

U.S. PATENT DOCUMENTS

| | | | |
|---|---|---|---|
| 4,946,531 A | 8/1990 | Crouch et al. | 156/242 |
| 4,999,215 A | 3/1991 | Akagi et al. | 427/41 |
| 6,123,026 A | 9/2000 | Gottlieb | 102/293 |
| 6,214,460 B1 | 4/2001 | Bluem et al. | 428/355 AC |
| 6,364,465 B1 * | 4/2002 | Chandrasekaran | 347/65 |
| 6,420,032 B1 | 7/2002 | Iacovangelo | 428/412 |
| 6,511,789 B2 | 1/2003 | Naiini et al. | 430/283.1 |
| 6,784,962 B2 | 8/2004 | Sumida et al. | 349/122 |
| 2002/0057413 A1 * | 5/2002 | Sumida et al. | 349/187 |
| 2004/0223103 A1 * | 11/2004 | Elman | 349/117 |

* cited by examiner

*Primary Examiner* — Gregory Listvoyb
(74) *Attorney, Agent, or Firm* — Koppel, Patrick, Heybl & Philpott

(57) ABSTRACT

An adhesion promoter for enhancing the bond between adjacent layers of a multilayer structure to prevent delamination thereof is disclosed. The adhesion promoter comprises an aromatic polyimide-based UV-cured acrylate. Also disclosed are laminated structures including liquid crystal displays and bonded missile domes that utilize an adhesion promoter of the invention, and methods for fabricating such structures.

7 Claims, 3 Drawing Sheets

LAMINATED STRUCTURES USING UV-CURABLE ADHESION PROMOTERS

CROSS REFERENCES TO RELATED APPLICATIONS

This application is a divisional of U.S. patent application Ser. No. 11/478,957, filed Jun. 29, 2006 now abandoned, titled "UV-Curable Adhesion Promoter, Laminated Structures Using Same and Methods for Fabricating Such Laminated Structures", which is a continuation-in-part of U.S. patent application Ser. No. 11/434,641, filed May 15, 2006 now U.S. Pat. No. 7,671,945, titled "UV Curable Alignment Material for Fabrication of Monolithic Compensators for Liquid Crystal Displays", which in turn is a continuation-in-part of U.S. patent application Ser. No. 11/241,070, filed Sep. 30, 2005 now U.S. Pat. No. 7,515,231 and titled "New Low Temperature Low Cost Liquid Crystal Alignment Material"; all of the foregoing applications are incorporated herein by reference.

FIELD OF THE INVENTION

This invention relates generally to laminated optical apparatus and particularly to the prevention of the delamination of such apparatus.

BACKGROUND OF THE INVENTION

One example of a laminated optical apparatus is a flat panel display such as a liquid crystal display (LCD). LCDs exist in a multitude of embodiments depending upon the specific type of liquid crystal material and the configuration of the polarizers and electrodes. In its simplest form, a typical LCD comprises a liquid crystal cell comprising a pair of optically transparent substrates, each of which has an outer surface to which additional optical films, including without limitation a polarizer or compensator layer, can be applied.

Many LCDs exhibit optical performance that is highly sensitive to the angle at which the display is viewed. Optical compensation layers, also referred to as compensators or retarders, are commonly used to mitigate the viewing angle effects in LCDs. Such a compensator or retarder layer may be applied directly to the outer surface of each substrate so as to be situated between the substrate and an associated polarizer layer.

Delamination of a layer applied to an LCD, including without limitation a compensator or polarizer layer laminated or adhesively bonded to a substrate, often occurs in LCDs. To improve the interfacial adhesive forces between the applied layer and the substrate, the layer-receiving surface of the substrate may be treated before application by, for example, plasma or corona discharge surface treatment, acid/base etching, or the like. These treatments are usually time-consuming and not always effective, particularly for certain substrates such as fluorinated compounds.

As an alternative to the foregoing surface treatments, adhesion promoters such as acrylic polymers (an example of which is General Electric's SHP401 primer) applied to the layer-receiving surface of the substrate have been used in an effort to prevent delamination. However, the interfacial forces provided by such adhesion promoters have often been inadequate to prevent delamination.

Another example of a laminated optical apparatus subject to delamination is the window or dome structure that houses the optical sensors carried by a missile. Such a dome structure may comprise a pair of adhesively bonded optically transparent sapphire substrates or layers. The severe operating environment of the missile subjects the dome structure to high temperatures and mechanical stresses often causing separation of the dome layers along the adhesive bond.

SUMMARY OF THE INVENTION

In accordance with one aspect of the invention, there is provided an adhesion promoter for enhancing the bond between adjacent layers of a multilayer structure to prevent delamination thereof. Examples of multilayer structures that may advantageously utilize the adhesion promoter of the invention include, without limitation, liquid crystal displays and bonded missile domes.

Broadly, the adhesion promoter of the invention comprises an aromatic polyimide-based UV-cured acrylate. More specifically but without limitation, the adhesion promoter comprises an aromatic polyimide and a UV-cured resin, wherein the proportions by weight of the constituents are effective to enhance the bond between adjacent layers of a laminated structure. Preferably, the relative proportions, by weight, of the constituents are from 20% to 60% of the aromatic polyimide and from 40% to 80% of the UV-cured resin for a total of 100 parts of the constituents.

Pursuant to another aspect of the invention there is provided a mixture for producing an adhesion promoter, the mixture comprising (a) an aromatic polyimide; (b) a UV-curable resin; and (c) a solvent comprising (1) ethyl L-lactate and (2) isopropanol wherein the percentages by weight of the constituents (a), (b) and (c) are effective to produce an adhesion promoter for enhancing a bond between adjacent layers of a laminated structure. Preferably, the relative proportions, by weight, of the constituents (a), (b) and (c) are from 0.2% to 0.6% of (a), from 0.4% to 0.8% of (b), from 55% to 64% of (c)(1), and from 35% to 44% of (c)(2), for a total of 100 parts of (a), (b) and (c).

In accordance with a specific exemplary embodiment, there is provided a liquid crystal display comprising a pair of optically transparent substrates defining a liquid crystal cell, each substrate of the pair of substrates having an outer surface carrying a multilayer structure comprising in sequence from the outer surface an adhesion promoter layer, a pressure sensitive adhesive layer, a second adhesion promoter layer and an optical layer, each of the adhesion promoter layers comprising an aromatic polyimide-based UV-cured acrylate.

In accordance with another specific exemplary embodiment, there is provided a laminated structure comprising a first substrate and a second substrate, the substrates being optically transparent at selected wavelengths. A surface of the first substrate is in confronting relationship with a surface of the second substrate, and an adhesive layer is disposed between the surfaces. A first UV-cured adhesion promoter layer joins the surface of the first substrate and the adhesive layer, and a second UV-cured adhesion promoter layer joins the surface of the second substrate and the adhesive layer. In one form of this embodiment, the first and second layers are made of sapphire. In another form, each of the first and second adhesion promoter layers comprises an aromatic polyimide-based UV-cured acrylate. Preferably, each of the adhesion promoter layers comprises an aromatic polyimide and a UV-cured resin, wherein the percentages by weight of the constituents are effective to enhance the bond between the surface of the associated substrate and the adhesive layer.

Pursuant to another specific, exemplary embodiment of the invention, there is provided a method of fabricating a laminated, optically transparent structure comprising preparing a mixture by dissolving an aromatic polyimide and a UV-curable resin in a solvent, stirring the mixture, filtering the mixture, coating the mixture on a surface of a substrate, air drying the coated mixture, and curing the coated mixture using UV radiation, the cured coated mixture comprising an adhesion promoter layer. The method may further comprise applying an optical layer such as a compensator or polarizer over the cured adhesion promoter coating.

BRIEF DESCRIPTION OF THE DRAWINGS

Further objects, features and advantages of the invention will become apparent from the detailed description, below, when read in conjunction with the accompanying drawings in which.

DETAILED DESCRIPTION

The following description is of a best mode presently contemplated for practicing the invention. This description is not to be taken in a limiting sense but is made merely for the purpose of describing the general principles of the invention whose scope may be ascertained by referring to the appended claims.

Figure 1:
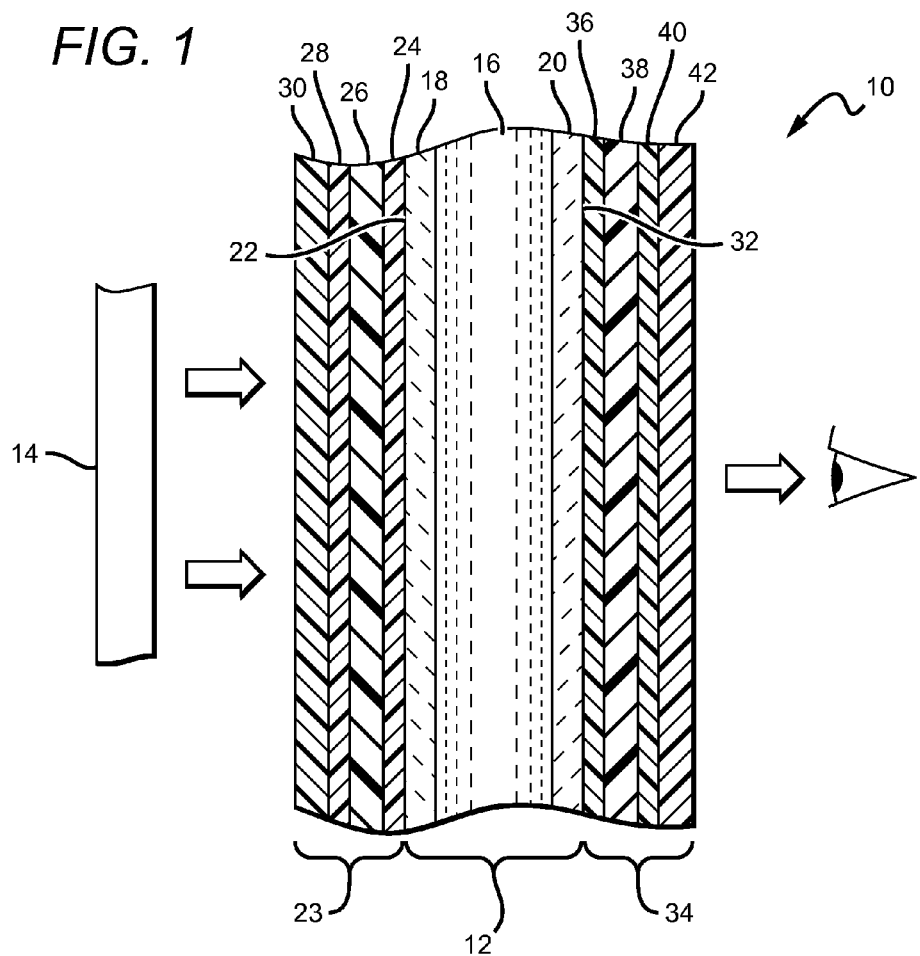
FIG. 1 is a schematic, cross section view of a portion of a laminated optical apparatus in the form of an LCD in accordance with a specific, exemplary embodiment of the present invention.

FIG. 1 is a schematic illustration of a portion of a laminated or layered optical apparatus in the form of an LCD 10 incorporating features of the invention.

The LCD 10 comprises a liquid crystal cell 12 illuminated by a rear illumination source 14. The liquid crystal cell may comprise a twisted nematic liquid crystal material 16 encapsulated between two optically transparent plates or substrates 18 and 20 of, for example, glass. The substrates 18 and 20 carry typical LCD features (not shown) including, for example, color filters, thin film transistor multiplex drive electronics, transparent electrodes and liquid crystal alignment films on the source and viewer sides. Applied to an outer surface 22 of the rear or source side liquid crystal cell substrate 18 is a multilayer structure 23 comprising an adhesion promoter layer 24, a pressure sensitive adhesive (PSA) layer 26, a second adhesion promoter layer 28 and, finally, a rear polarizer layer 30 adjacent to the rear illumination source 14. The PSA layer 26 may comprise any of a variety of commercially available optically transparent PSA products from such suppliers as 3M, Sumitomo Chemical, Nitto Denko Corp., and so forth. The rear polarizer layer 30 may comprise, by way of example, a thin sheet of stretched polyvinyl alcohol (PVA) stained with iodine.

In accordance with an aspect of the invention, the adhesion promoter layers 24 and 28 are preferably fabricated of an aromatic polyimide-based UV-cured acrylate. The adhesion promoter layers 24 and 28 provide strong interfacial bonds between the PSA layer 26 and the rear polarizer layer 30, and between the PSA layer 26 and the surface 22 of the rear or source side liquid crystal cell substrate 18 preventing delamination of the PSA and polarizer layers 26 and 30.

The PSA layer 26 may have a thickness in the range of, for example, 1 to 2 μm. Each of the adhesion promoter layers 24 and 28 is very thin (for example, less than 0.2 μm thick such as in the range of 0.05 to 0.15 μm) so as not to attenuate or otherwise affect light transmitted through the liquid crystal cell 12.

Overlying an outer surface 32 of the front or viewer side liquid crystal cell substrate 20 is a multilayer structure 34 like the structure 23 on the source side of the cell 12. The multilayer structure 34 comprises an adhesion promoter layer 36, a PSA layer 38, a second adhesion promoter layer 40, and a front polarizer layer 42 (commonly referred to as the analyzer layer). The materials, thicknesses, and so forth of the front side layers are preferably the same or substantially the same as those of the rear side layers.

Each of the adhesion promoter layers 24, 28, 36 and 40 may comprise, as constituents, an aromatic polyimide and a UV-cured resin, the percentages by weight of the constituents being effective to enhance the bond between adjacent layers of the LCD structure. By way of example, the relative proportions of the constituents may preferably comprise, by weight, from 20% to 60% of aromatic polyimide, and from 40% to 80% of UV-cured resin for a total of 100 parts. More preferably, the relative proportions of the constituents may comprise, by weight, from 30% to 50% of aromatic polyimide and from 50% to 70% of UV-curable resin for a total of 100 parts. Most preferably, the relative proportions of the constituents may comprise, by weight, from 35% to 45% and from 55% to 65%, respectively, for a total of 100 parts.

Figure 2:
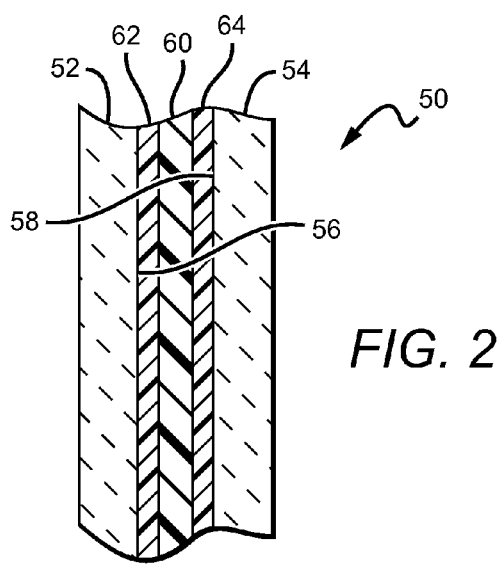
FIG. 2 is a schematic, cross section view of a portion of a laminated optical apparatus in the form of a missile dome in accordance with another specific, exemplary embodiment of the present invention.

FIG. 2 is a schematic illustration of a portion of another example of a laminated or layered optical apparatus utilizing features of the present invention. The apparatus of FIG. 2 is in the form of a high strength, bonded, optically transparent dome 50 forming part of a missile and incorporating features of the invention. The dome 50 may enclose one or more of a variety of optical sensors for performing such tasks as missile guidance and target acquisition. The dome 50 comprises an inner substrate or layer 52 and an outer substrate or layer 54, each of the layers 52 and 54 being formed of a high strength, heat resistant material such as sapphire having the desired optical, mechanical and thermal properties.

The dome layers 52 and 54 are joined along confronting faces 56 and 58 by means of an adhesive layer comprising, for example, a UV cure clear silicone elastomer such as that supplied by Gelest, Inc., under the trademark ZIPCONE™ UE. The adhesive layer 60 may be 1 to 2 μm thick and optically transparent to the wavelengths of interest, for example, 3-5 μm. Interposed between the face 56 of the inner dome layer 52 and the adhesive layer 60 is a UV-cured adhesion promoter layer 62. A similar UV-cured adhesion promoter layer 64 is interposed between the face 58 of the outer dome layer 54 and the adhesive layer 60. In accordance with an aspect of the invention, each of the adhesion promoter layers 62 and 64 comprises an aromatic polyimide-based UV-cured acrylate providing high resistance to delamination of the dome layers 52 and 54. Each of the adhesion promoter layers 62 and 64 is sufficiently thin, for example, less than 0.2 μm thick (such as in the range of 0.05 to 0.15 μm) so as not to attenuate or otherwise affect the transmitted or received optical is preferably the same as that described above in connection with FIG. 1.

The following are non-limiting examples of materials and fabrication processes that may be employed in practicing the invention.

The adhesion promoter of the invention preferably comprises a UV curable composition basically comprising a mixture of an aromatic polyimide, such as a segmented, rigid-rod aromatic polyimide, and a UV-curable acrylate photopolymer. In accordance with one, specific exemplary embodiment, the adhesion promoter may be fabricated from the following materials:

Aromatic polyimide: PYRALIN™ PI4700 (DuPont)
UV curable resin: Norland Optical Adhesive 68 (NOA 68) (Norland)
Solvent: Ethyl L-lactate (Spectrum) and Isopropanol (Aldrich)

EXAMPLE 1

Figure 3:
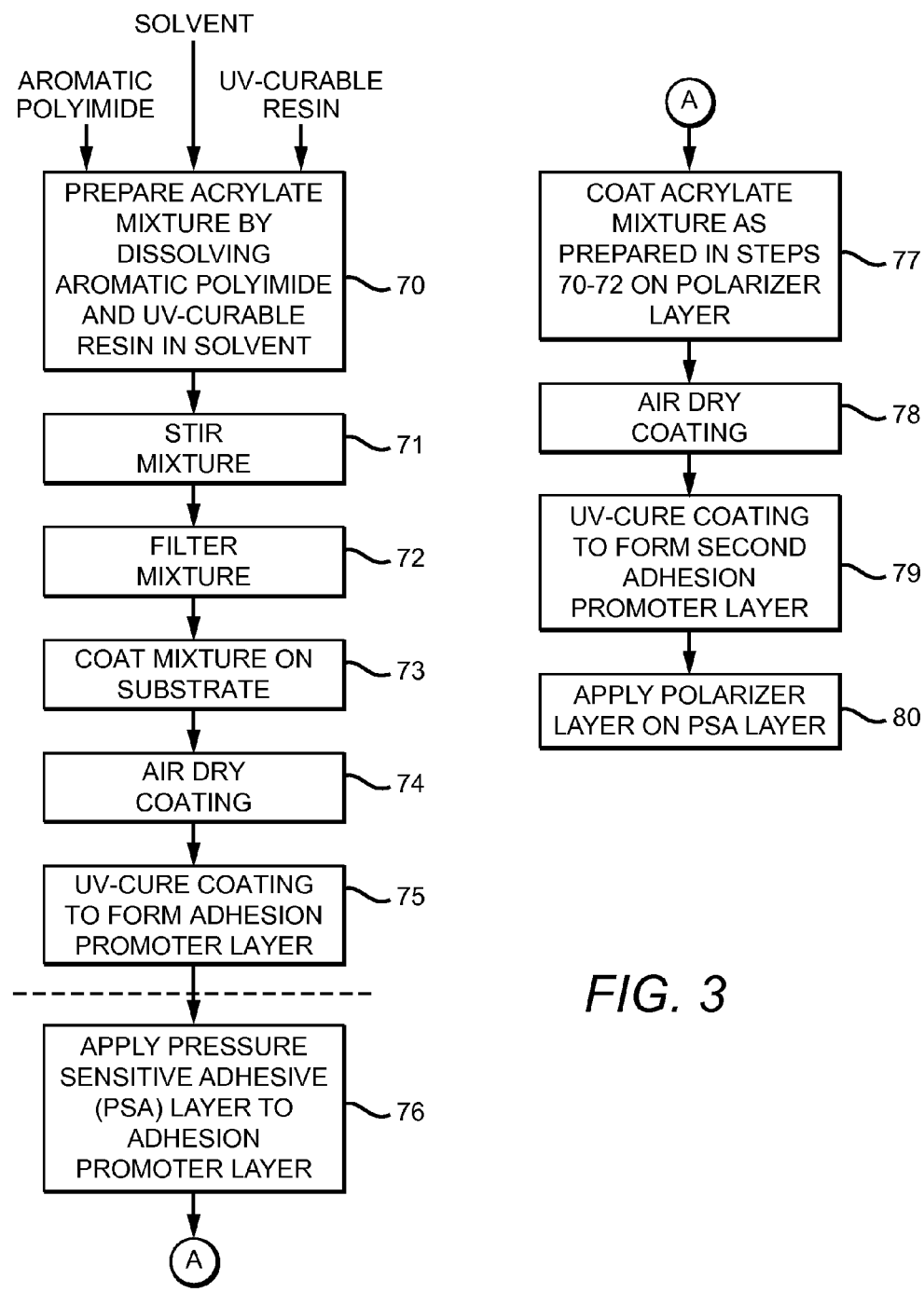
FIG. 3 is a flow chart showing an example of a process in accordance with an aspect of the present invention for fabricating the apparatus of FIG. 1.

FIG. 3 is a flow chart showing preferred steps for fabricating laminated or layered structures utilizing aspects of the present invention. For example, an adhesion promoter mixture was prepared by dissolving (step 70) 0.4 g of aromatic polyimide and 0.6 g of UV curable resin in a solvent comprising 59.4 g of ethyl L-lactate and 39.6 g of isopropanol, for a total of 100 g. The mixture was stirred (step 71) for about 2 hours using a magnetic stirrer. The mixture was then filtered (step 72) through a filter membrane having a 0.45 μm pore size. The mixture was coated (step 73) on a surface of a glass substrate by spin-coating at a speed of 1,500 rpm for 30 seconds. Alternatively, the mixture may be coated on the surface of the substrate by, for example, dipping, spraying or brushing. The coating was air-dried (step 74) at a temperature of 50° C. for 10 minutes, and then UV-cured (step 75) in a nitrogen atmosphere by means of a UV fusion lamp conveyor system with the conveyor moving at a speed of 10 fpm, to form the final adhesion promoter layer.

The relative proportions by weight of the adhesion promoter constituents are preferably in the range of 0.2-0.6% of aromatic polyimide, 0.4-0.8% of UV curable resin, 55-64% of ethyl L-lactate and 35-44% isopropanol for 100% of the mixture of the four constituents. More preferably, the relative proportions by weight may be 0.3-0.5% aromatic polyimide, 0.5-0.7% UV curable resin, 57-62% ethyl L-lactate and 37-42% isopropanol for 100% of the mixture, and most preferably the relative proportions by weight may be 0.35-0.45% aromatic polyimide, 0.55-0.65% UV curable resin, 59-60% ethyl L-lactate and 39-40% isopropanol for 100% of the mixture.

In accordance with one exemplary application of the foregoing process, an optical layer (not shown) such as a polarizer or an optical compensator of, for example, a thin sheet of stretched PVA, may be applied over the adhesion promoter layer prepared in steps 70-75 to provide a strong, delamination-resistant bond between the substrate and the overlying optical layer.

Alternatively, as further shown in FIG. 3, an LCD such as that illustrated in FIG. 1 was fabricated by applying (step 76) a PSA layer to the adhesion promoter layer formed in steps 70-75, coating an acrylate mixture as prepared in steps 70-72 on a polarizer layer (step 77), followed by air-drying and UV-curing of the coating (steps 78 and 79) to form a second adhesion promoter layer in the manner described in steps 74 and 75, and applying the coated polarizer layer (step 80) to the PSA layer.

Alternatively, for the percentage ranges of aromatic polyimide and isopropanol specified above, the solvent may comprise from 55% to 100%, by weight, of ethyl L-lactate and from 0% to 45%, by weight, of isopropanol for 100 parts of the solvent.

EXAMPLE 2

Figure 4:
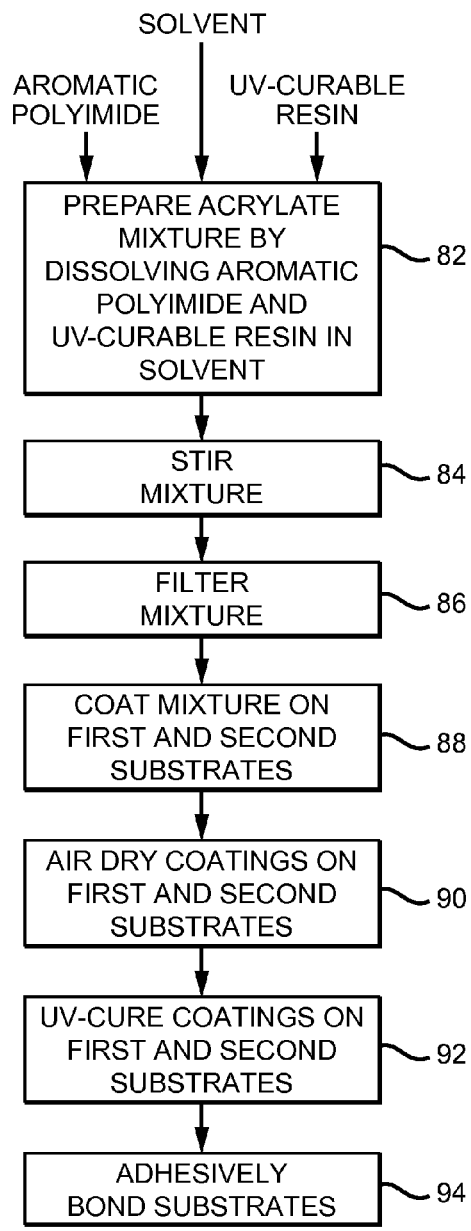
FIG. 4 is a flow chart showing an example of a process in accordance with an aspect of the present invention for fabricating the apparatus of FIG. 2.

FIG. 4 is a flow chart showing the steps of a preferred process for fabricating a laminated or layered optical structure such as that shown in FIG. 2. An adhesion promoter mixture of aromatic polyimide, UV-durable resin and solvent was prepared by dissolving (step 82), stirring (step 84) the mixture and filtering (step 86) as in Example 1. The mixture was coated (step 88) on the surfaces of the first and second sapphire substrates as in Example 1. The coatings on the substrates were air-dried (step 90) and UV-cured (step 92) as in Example 1 to form an adhesion promoter layer on each substrate. The substrates were then bonded (step 94) by applying a layer of an optically transparent adhesive such as ZIPCONE™ UE mentioned above on the adhesion promoter layer on one of the sapphire substrates and the two sapphire substrates were then joined to form the structure depicted in FIG. 2. The relative proportions by weight of the adhesion promoter constituents were the same as those set forth in Example 1.

By way of example and not by way of limitation, the adhesion promoter of the present invention may be used to enhance adhesion between:

1. an organic substrate and an organic thin film;
2. an organic substrate and an inorganic thin film;
3. an organic substrate and an organic substrate;
4. an inorganic substrate and an inorganic thin film; and
5. an inorganic substrate and an inorganic substrate.

Examples of organic materials include, but are not limited to, polycarbonate, polypropylene, polyimide and fluorocarbon. Examples of inorganic materials include, but are not limited to, oxide, fluoride and sulfide materials.

While several illustrative embodiments of the invention have been disclosed herein, still further variations and alternative embodiments will occur to those skilled in the art. Thus, the adhesion promoter forming one aspect of the invention is useful wherever the prevention of film delamination is an important goal and accordingly is amenable to a broad range of applications including, besides those described above, the adhesive bonding between a window pane and a UV or IR protective film, or between a polycarbonate headlight lens and an abrasion resistant hardcoat. Such variations and alternative embodiments are contemplated, and can be made without departing from the spirit and scope of the invention as defined in the appended claims.

I claim:

1. A liquid crystal display comprising a pair of optically transparent substrates defining a liquid crystal cell, each substrate of the pair of substrates having an outer surface carrying:
   a pressure sensitive adhesive layer;
   an adhesion promoter layer comprising as constituencies:
   (a) an aromatic polyimide; and
   (b) a UV-cured resin,
   wherein the percentages by weight of the constituents (a) and (b) are effective to enhance the bond between adjacent layers of a laminated structure; and
   an optical layer,
wherein
   the adhesion promoter layer is interposed between and joining the adhesive layer and the outer surface of the substrate,
   the pressure sensitive adhesive layer is interposed between and joining the adhesion promoter layer and the optical layer, and
   the adhesion promoter layer is effective to enhance the bond between adjacent layers of a laminated structure.

2. The display of claim 1, wherein the relative proportions, by weight, of the constituents (a) and (b) are from 20% to 60% of (a), and from 40% to 80% of (b) for a total of 100 parts of (a) and (b).

3. The display of claim 1, wherein the relative proportions, by weight, of the constituents (a) and (b) are from 30% to 50% of (a), and from 50% to 70% of (b) for a total of 100 parts of (a) and (b).

4. The display of claim 1, wherein the relative proportions, by weight, of the constituents (a) and (b) are from 35% to 45% of (a), and from 55% to 65% of (b) for a total of 100 parts of (a) and (b).

5. The display of claim 1, wherein the optical layer comprises a compensator.

6. The display of claim 1, wherein the optical layer comprises a polarizer.

7. The display of claim 1, wherein the adhesion promoter layer has a thickness in the range of 0.05 to 0.15 μm.

* * * * *

UNITED STATES PATENT AND TRADEMARK OFFICE
CERTIFICATE OF CORRECTION

PATENT NO. : 8,310,632 B2  
APPLICATION NO. : 12/799972  
DATED : November 13, 2012  
INVENTOR(S) : Cheung Page 1 of 1

It is certified that error appears in the above-identified patent and that said Letters Patent is hereby corrected as shown below:

In the claims:  
Claim 1, Col. 6, Paragraph 4, Line 52, please change [constituencies] to --constituents--

Signed and Sealed this  
Twelfth Day of March, 2013

Teresa Stanek Rea  
*Acting Director of the United States Patent and Trademark Office*